(No Model.)
L. SCHAEFER.
METHOD OF AUTOMATICALLY CLOSING AN INTERRUPTED ELECTRIC CIRCUIT.
No. 413,735. Patented Oct. 29, 1889.
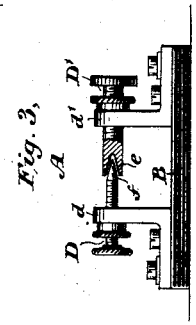
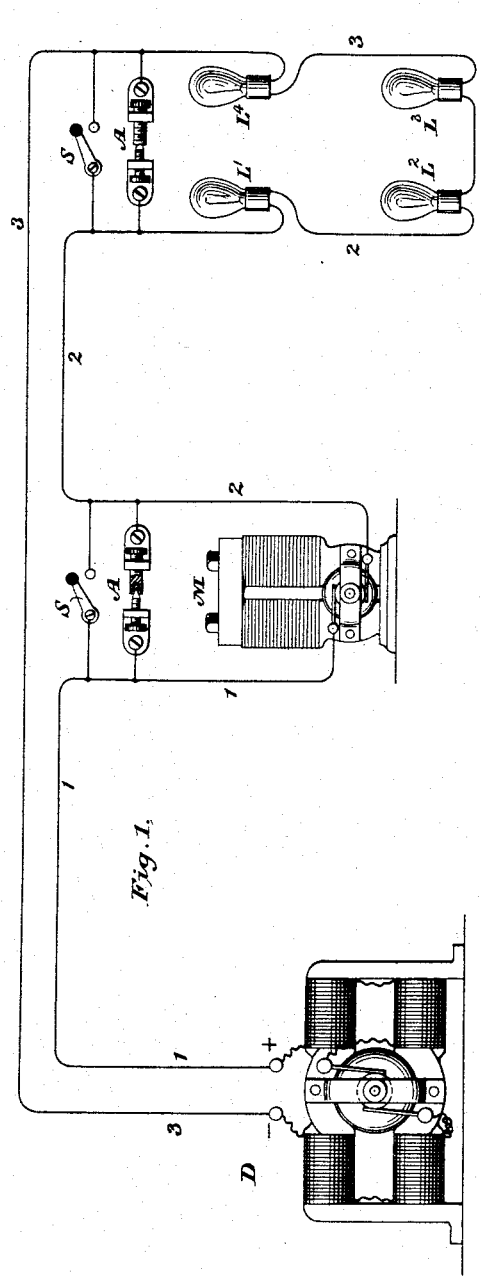
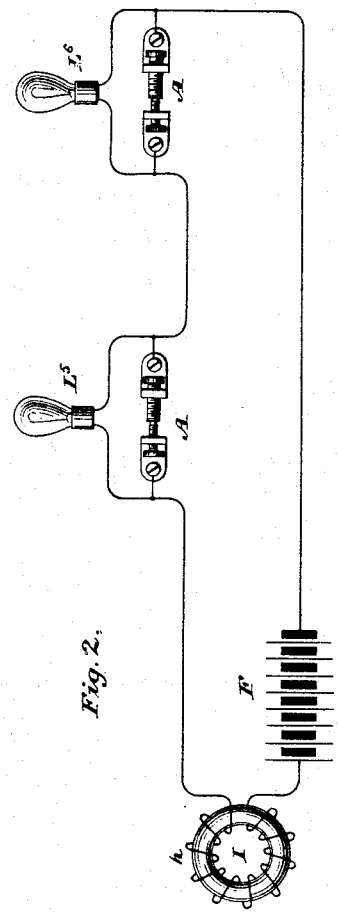
Witnesses
Geo. W. Breck.
Carrie E. Ashley
Inventor
Leonard Schaefer
By his Attorneys
Pope Edgecomb & Fury

UNITED STATES PATENT OFFICE.

LEONARD SCHAEFER, OF BOSTON, MASSACHUSETTS, ASSIGNOR TO THE WESTINGHOUSE ELECTRIC COMPANY, OF PITTSBURG, PENNSYLVANIA.

METHOD OF AUTOMATICALLY CLOSING AN INTERRUPTED ELECTRIC CIRCUIT.

SPECIFICATION forming part of Letters Patent No. 413,735, dated October 29, 1889.

Application filed February 16, 1889. Serial No. 300,163. (No model.)

*To all whom it may concern:*

Be it known that I, LEONARD SCHAEFER, a citizen of the United States, residing in Boston, in the county of Suffolk and State of Massachusetts, have invented a new and useful Method of Automatically Closing an Interrupted Electric Circuit, of which the following is a specification.

My invention is designed more especially to be used in connection with systems of electrical distribution in which translating devices of any character are included in series in the same circuit. When two or more electrical translating devices are arranged and operated in this manner, any interruption of the main circuit occurring in or about any of the translating devices—such, for example, as the breaking of a wire or of the filament of an incandescent lamp, or the burning out of the armature of a motor—will have the effect of interrupting the further operation of all the other translating devices included in the same circuit until the location of the interruption has been determined and suitable means employed to restore the continuity of the circuit.

In accordance with my invention, an auxiliary normally-open circuit is provided between any two points in the main circuit where an accidental interruption is liable to occur, and a mass of fusible conducting material is placed in such a relation to the adjacent terminals of such normally-open circuit that, upon the occurrence of an inductive electric discharge of a potential higher than that normally employed in the operation of the translating devices, said material will be instantly fused and will flow into such a position as to permanently complete said normally-open circuit, and thus the continuity of the main line will be automatically restored.

My invention consists in a method of effecting the operation of closing the normally-open circuit in such cases by the inductive discharge of an electro-magnetic helix included in the main circuit, which discharge is instantaneously produced whenever said circuit is suddenly interrupted in any one of the translating devices.

In the accompanying drawings, Figures 1 and 2 are diagrammatic representations of electric circuits to which my invention has been applied; and Fig. 3 is a detail elevation, partly in section, of a portion of the apparatus by means of which my invention is carried out.

In Fig. 1, D represents a dynamo-electric machine of well-known construction. This serves as a generator of electricity, which is conveyed through a normally-closed circuit to suitable translating devices—such as electric motors, electric lamps, or the like—which translating devices are included in series in said circuit. For example, we may trace the current of the dynamo D from the positive terminal, marked +, by the wire 1, to an electric motor M, thence by the wire 2 to incandescent lamps $L'$ $L^2$ $L^3$ $L^4$, which are placed in series in the circuit, one after the other, and thence returning by the wire 3 to the negative terminal of the dynamo, marked —. When the translating devices are thus arranged, it is evident that any interruption of the continuity of the main circuit in either of the translating devices will prevent the action of the others. Thus, for example, the breaking of the incandescent conductor or filament in the lamp $L'$ would not only extinguish the lamps $L^2$ $L^3$ $L^4$, but would also stop the motor M, and, on the other hand, the burning off of the armature-wire in the motor M would not only stop the motor, but would simultaneously extinguish all the lamps. Heretofore it has been usual to provide short-circuiting or cut-out switches, whereby the terminals of a translating device may be connected together in case of the occurrence of such accidents, or when for any reason it is desired to divert the current from the translating devices. In this manner the motor M may be cut out by closing a switch S, and the whole group of incandescent lamps $L'$ $L^2$ $L^3$ $L^4$ may in like manner be cut out by closing the switch $S'$.

In carrying out my invention I make use of an automatic cut-out, which is shown at A $A'$ in Fig. 1, and in detail in Fig. 3. I prefer to construct this device in the form of two adjustable metallic screws D $D'$, which are mounted, in the same axial line, in metallic standards $d$ $d'$, these being insulated from each other and supported upon a suitable base B. The screw $D'$ has a tapering hole E bored in its tip, and the other screw D is fitted with a tapering or conical plug of fusible conducting material $f$, which plug enters concentrically within the tapering hole in the screw D', without touching its sides, and may be adjusted as required by screwing the same in or out through the standard $d$. The standards $d$ $d'$ are permanently connected with the terminals of the translating device which it is desired to protect, or with any other two points on the normally-closed circuit between which it is apprehended that an accidental interruption may occur.

The method of operation is as follows: In the ordinary operation of the system the lamps L' $L^2$ $L^3$ $L^4$, the motor M, and the dynamo-electric generator D are all included in a continuous closed circuit, the electro-magnets of the dynamo and of the motor being maintained in a condition of continuous and powerful magnetization. Upon the occurrence of an interruption of the current at any one of the translating devices the sudden drop in the magnetism of the dynamo-magnets produces a momentary electric impulse in the circuit of much higher potential than the normal current. This causes a spark to be projected across the narrow space intervening between the inner surface of the screw $D^2$ and the fusible plug $f$, (shown in Fig. 3,) the effect of which is to fuse the tip $f$ or a portion of it. The fused metal flows downward by gravity and establishes a permanent conducting-connection, thus automatically closing the normally-open shunt and cutting out or shunting the defective portion of the circuit.

In a circuit supplied by a self-exciting dynamo-electric machine of ordinary construction it is found by experience that the discharge of the field-magnets is sufficiently energetic to operate the devices which I have described; but in case a dynamo with separately-excited field-magnets is employed, or when the operating-current is derived from a primary or a storage battery, it is usually necessary to employ a special device for producing the impulse for automatically restoring the circuit. I have shown such a device in Fig. 2, in which a circuit containing two lamps $L^5$ $L^6$, arranged in series, is supplied with current by a storage-battery F. Included in the circuit is an inductor I, of well-known construction, composed of an iron core in the form of a continuous ring, forming a closed magnetic circuit, upon which is wound a single helix $h$, which is included in and forms part of the main circuit. The mode of operation is identical with that which has already been described, except that the discharge-current comes from the inductor instead of from the dynamo-magnets.

I claim as my invention—

The hereinbefore-described method of automatically closing a normally-open circuit between two given points upon the interruption of a normally-closed circuit between the same points, which method consists in utilizing a momentary current of abnormal potential, caused by the inductive discharge of an electro-magnet included in said circuit, to act upon an interposed fusible material in such a manner as to permanently complete said normally-open circuit, substantially as set forth.

In testimony whereof I have hereunto subscribed my name this 1st day of February, A. D. 1889.

LEONARD SCHAEFER.

Witnesses:
 JACOB WASHBURN,
 PHŒBUS H. ALEXANDER.